Patented July 29, 1930

1,771,481

UNITED STATES PATENT OFFICE

RAYMOND C. BENNER, OF BAYSIDE, AND ALFRED PAUL THOMPSON, OF JACKSON HEIGHTS, NEW YORK, ASSIGNORS TO GENERAL CHEMICAL COMPANY, OF NEW YORK, N. Y., A CORPORATION OF NEW YORK

PROCESS FOR THE RECOVERY OF SULPHUR FROM GASES

No Drawing. Application filed June 30, 1926. Serial No. 119,740.

This invention relates to improvements in the recovery of sulphur from gases and more particularly to the recovery of sulphur from gases in which it exists in oxidized condition, that is, as sulphur dioxide such as in gases from roasting or smelting furnaces, and the like.

It is well known that the sulphur dioxide resulting from the roasting and smelting of sulfide ores creates a great nuisance when discharged into the atmosphere. It has, therefore, become necessary to avoid this nuisance by converting the sulphur dioxide into compounds, as for example, sulfuric acid, sulfides, sulfates, etc., or by reducing it to elemental sulphur. In the processes for carrying out the latter alternative, it has been proposed to bring the gas mixture containing sulphur dioxide into contact with reducing agents, as for example, coke, whereby the sulphur is set free in elemental form. Such processes, as heretofore known, have not, however, been marked with any degree of success.

It is the object of our invention to provide an efficient process for the rapid and complete reduction of sulphur dioxide either in the pure state or in gas mixtures and the recovery of elemental sulphur. The reaction between sulphur dioxide and reducing gases is normally comparatively slow and far from complete. Consequently a considerable excess of reducing gas is required and a comparatively long time necessary to render the process sufficiently complete for commercial use. But the excess of reducing gas and the time required lower the efficiency of the process to such an extent that its commercial application has been generally considered economically impossible.

Broadly, our invention consists in the recovery of sulphur from gases containing oxides of sulphur by mixing the sulphur gases with a non-sulfurous reducing gas, or with a mixture of sulfurous and non-sulfurous reducing gas, with or without the addition of inert gases and bringing such gas mixtures in contact with bauxite under conditions which will insure rapid and complete interaction. More particularly the invention consists in recovering sulphur from gases containing sulphur dioxide by mixing such gases with a requisite proportion of non-sulfurous, or a mixture of a sulfurous and non-sulfurous reducing gas to which may be added a small amount of a gaseous catalyst, as for example ammonia vapor, and passing such mixed gases at elevated temperatures in contact with bauxite, a natural mineral, having a chemical composition consisting principally of hydrated alumina and iron oxide. When employing bauxite as a catalyst for the reduction of sulphur dioxide with reducing gases the rate of the interaction is very greatly increased, i. e., the time required for reaction is very materially reduced. This permits gas speeds which render the process commercially applicable. Furthermore, the catalyst has the property of causing substantially complete interaction of the gases at commercial gas speeds so that there is substantially no excess of reducing gas required, thereby rendering the process highly efficient.

We have discovered that an especially adaptable reducing medium comprises carbonaceous reducing agents such as the gaseous products of comparatively low temperature carbonization of soft coal, known as coal gas. Coal gas comprises such reducing hydrocarbons as methane ($CH_4$), acetylene ($C_2H_2$), ethylene ($C_2H_4$) as well as carbon monoxide and hydrogen. The hydrocarbons and hydrogen, while serving as active reducing agents also serve to prevent the formation of the sulfides of carbon, as for example carbon oxysulfide (COS), which have a tendency to form in the presence of carbonaceous reducing agents. Other gaseous reducing agents may also be used, as for example producer gas, water gas, natural gas, or mixtures of these.

Furthermore, we have discovered that bauxite, a natural mixture of hydrated alumina and iron oxide exhibits a very great catalytic effect on the interaction of the sulphur dioxide with the above mentioned reducing gases. By experiment we have ascertained that bauxite catalyzes to a marked degree the reducing action on sulphur dioxide of each of the separate constituents of coal gas, thereby being especially adaptable for the catalysis of the interaction of sulphur dioxide with coal gas as a whole. Furthermore, we have found that bauxite exhibits a marked catalytic effect upon the reduction of sulphur dioxide with carbon monoxide, thereby enabling us to employ such reducing agents as producer gas or water gas, containing substantial amounts of this constituent.

While bauxites of varying compositions may be used as catalysts or contact agents, we have found that a particularly active and durable substance is that known as French bauxite. A typical analysis of French bauxite is as follows:

|  | Per cent |
| --- | --- |
| Total alumina ($Al_2O_3$) | 57.16 |
| Total ferric oxide ($Fe_2O_3$) | 4.87 |
| Silicon dioxide ($SiO_2$) | 19.62 |
| Titanium oxide ($TiO_2$) | 3.11 |
| Calcium oxide (CaO) | .45 |
| Magnesium oxide (MgO) | .51 |
| Loss on ignition | 13.95 |

This particular bauxite is found to be physically durable at the elevated temperatures of the reaction and to retain its catalytic activity for long periods without purification, thereby being particularly adaptable to our novel process.

Instead of bauxite, there may be used any other natural material of similar composition containing alumina and iron oxide, or an artificial mixture of alumina or its hydrate with artificial or natural metallic oxides or their hydrates.

We have also found that various gaseous catalysts may be added and if present serve to increase the rate of reduction of the sulphur dioxide. Among these we find that ammonia vapor is particularly effective. When using unpurified coal gas as the reducing agent there is present sufficient ammonia to materially catalyze the reaction. When, however, other reducing gases are used, not containing ammonia, this gaseous catalyst may be added, if desired, in small amounts.

In carrying out the process of obtaining elemental sulphur the sulphur dioxide gas is mixed with a requisite quantity of the reducing gas, with or without the addition of ammonia vapor, and passed in contact with, preferably through, a layer of granular bauxite. The quantity of such reducing gas should be proportioned to the amount of oxygen present in the sulphur gases, whether in the free state or combined with sulphur. The temperature of the catalyst and the reaction zone should preferably be maintained at about 500° C. or above although the reaction will go substantially to completion at temperatures considerably below 500° C., but at a slightly lower rate of reaction. The maintenance of the desired temperature may be accomplished by preheating the gases or by burning a portion of the reducing gas with a limited amount of admixed oxygen or air.

Where, however, the sulphur dioxide containing gases are taken directly from a roasting or smelting furnace, such heating will of course be unnecessary as the gas is already sufficiently hot. The interaction of the sulphur dioxide and reducing gases is exothermic and the heat produced will materially assist in maintaining the requisite temperature. We have found that when maintaining a temperature preferably of 500° C. the sulphur dioxide in the gas mixture will be completely reduced by the reducing gases when such gas mixture is passed at commercial speed in contact with the bauxite catalyst.

The sulphur produced by the interaction of the sulphur dioxide with the various reducing gases according to the following typical equations:

$$CH_4 + 2SO_2 \rightarrow CO_2 + 2H_2O + 2S$$
$$2CO + SO_2 \rightarrow 2CO_2 + S$$
$$2H_2 + SO_2 \rightarrow 2H_2O + S$$

exists in the vapor form and may be condensed by heat interchange devices, as for example a waste heat boiler, or be collected by contact with suitable liquids, etc.

It is to be noted that in the statement of our invention, reference was made to the fact that a sulfurous reducing gas, as for example, hydrogen sulfide might be present among the reducing gases. Such hydrogen sulfide may occur with the sulphur dioxide to be reduced; or may produced with the coal gas, either by the presence of sulphur or sulphur compounds in the coal employed or by the addition of sulphur or sulphur dioxide, etc., during the carbonization of the coal and production of the coal gas, according to the typical reactions:

$$2SO_2 + C + CH_4 \rightarrow 2CO_2 + 2H_2S$$
$$2SO_2 + 3C + CH_4 \rightarrow 4CO + 2H_2S$$

or it may be aded to the gas mixture from an independent source. In all events its presence in small or large amounts is beneficial since it serves as an active reducing agent of the sulphur dioxide according to the equation:

$$2H_2S + SO_2 \rightarrow 2H_2O + 3S$$

We have also discovered that when the oxysulfide of carbon, (COS), is present in the gas mixture, either by its presence with the sulphur dioxide, or produced during the carbonization of the coal in the presence of sulphur or sulphur dioxide, or from any other source, it serves as a reducing agent and is itself quickly and completely oxidized by the sulphur dioxide in the presence of the bauxite catalyst to yield carbon dioxide and sulphur according to the equation $$2COS + SO_2 \rightarrow 3S + 2CO_2$$

Various modifications may be made in the process without departing from the spirit of our invention and we do not wish to limit the scope thereof except as defined in the appended claims.

We claim:

1. A process for the reduction of sulphur dioxide containing gas which consists in mixing the sulphur dioxide gas with a gas containing carbonaceous reducing agents and bringing said mixture at a suitable temperature into contact with bauxite.

2. A process for the reduction of sulphur dioxide containing gas which consists in mixing the sulphur dioxide gas with a gas containing carbon monoxide and bringing said mixture at a suitable temperature into contact with bauxite.

3. A process for the reduction of sulphur dioxide containing gas which consists in mixing the sulfurous gases with a gas containing hydrocarbons and free hydrogen and bringing said mixture at a suitable temperature into contact with bauxite.

4. A process for the reduction of sulphur dioxide containing gas which consists in mixing the sulfurous gases with coal gas and bringing the said mixture at a suitable temperature into contact with bauxite.

5. A process for the reduction of sulphur dioxide containing gas which consists in mixing the sulfurous gases with the volatile products of low temperature carbonization of soft coal and bringing said mixture at a suitable temperature into contact with a natural mineral substance containing alumina and iron oxide.

6. A process for the reduction of sulphur dioxide containing gas which consists in mixing the sulfurous gases with the volatile products of low temperature carbonization of soft coal and bringing said mixture at a temperature of 500° C. or above into contact with bauxite.

7. A process for obtaining sulphur from a gas containing oxides of sulphur which consists in mixing said gas with a gas containing non-sulfurous and sulfurous reducing agents and bringing said mixture at a suitable temperature into contact with bauxite.

8. A process for obtaining sulphur from a gas containing oxides of sulphur which consists in mixing said gas with a gas containing non-sulfurous reducing agents and bringing said mixture in the presence of ammonia vapor and at a suitable temperature in contact with bauxite.

9. A process for obtaining sulphur from a gas containing oxides of sulphur comprising the step of bringing a mixture of said gas, hydrogen sulfide, and non-sulfurous reducing agents at a suitable temperature and in the presence of ammonia vapor, in contact with bauxite.

10. A process for the reduction of sulphur dioxide containing gas which consists in mixing the sulphur dioxide gas with a gas containing non-sulfurous reducing agents and bringing said mixture at a suitable temperature into contact with a substance consisting principally of alumina.

11. A process for the reduction of sulphur dioxide containing gas which consists in mixing the sulphur dioxide gas with a gas containing non-sulfurous reducing agents and bringing said mixture at a suitable temperature into contact with a substance consisting principally of alumina and iron oxide.

In testimony whereof, we affix our signatures.

RAYMOND C. BENNER.
ALFRED PAUL THOMPSON.